United States Patent [19]

Kajimoto

[11] Patent Number: 5,150,459
[45] Date of Patent: Sep. 22, 1992

[54] CHARACTER DOT PATTERN SIGNAL GENERATOR

[75] Inventor: Kazuhiro Kajimoto, Suwa, Japan

[73] Assignee: Seiko Epson Corporation, Tokyo, Japan

[21] Appl. No.: 524,400

[22] Filed: May 11, 1990

[30] Foreign Application Priority Data

May 10, 1989 [JP] Japan .................................. 1-118095

[51] Int. Cl.[5] .............................................. G06F 3/14
[52] U.S. Cl. .................................... 395/151; 340/730; 340/748
[58] Field of Search ........................ 340/730, 735, 748

[56] References Cited

U.S. PATENT DOCUMENTS

| | | | |
|---|---|---|---|
| 4,785,391 | 11/1988 | Apley et al. ..................... | 395/139 X |
| 4,967,376 | 10/1990 | Katsura ............................... | 395/150 |
| 4,975,860 | 12/1990 | Kitaya et al. ..................... | 395/109 |
| 5,027,364 | 6/1991 | Jeng et al. ........................ | 395/128 X |

Primary Examiner—David L. Clark
Attorney, Agent, or Firm—Blum Kaplan

[57] ABSTRACT

A character pattern signal generator for generating a signal corresponding to a character being formed as a plurality of dots forming an outline body includes an outline memory for storing character code data corresponding to an outline of a standard size character. An outline data calculating circuit receives the outline data and a magnification signal and calculates character outline data in response thereto. A dot pattern generating circuit converts said character outline data into dot pattern data representing the character outline. A dot pattern compensating circuit detects a number of dots separated by a space from the body of the character outline and compensates the dot pattern data by a number of dots to be added to the dot pattern data at the space when the magnification factor is less than one and the number of dots is less than a predetermined value.

4 Claims, 3 Drawing Sheets

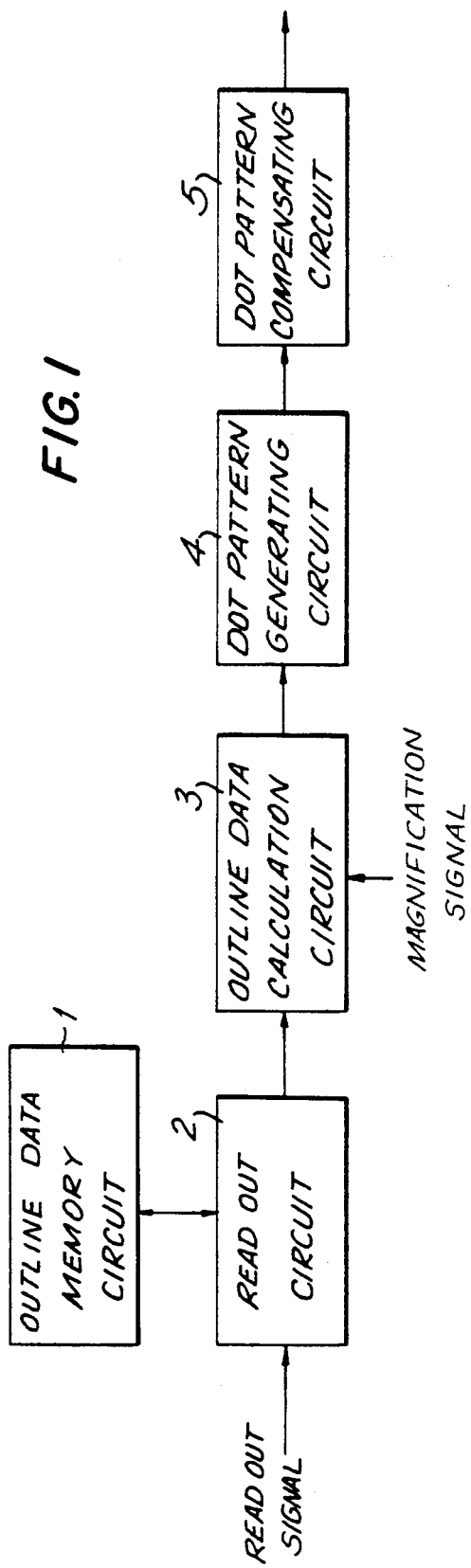

CHARACTER DOT PATTERN SIGNAL GENERATOR

BACKGROUND OF THE INVENTION

The present invention is directed to an apparatus for generating a character pattern signal, and in particular to an apparatus which generates a character pattern signal utilizing a dot pattern formed from outline data which are stored as bits of outline information.

In present word processors and the like, in order to enhance print quality of a character pattern, the number of dots which form the character pattern need to be increased. A conventional manner for obviating this problem has been through the introduction of an outline system. As shown in FIG. 5 of the drawings, in the outline system, the outline of a character is divided into a plurality of regions extending about the perimeter of a character such as regions, $J_0$, $J_1$, $J_2$. The coordinates of an initial starting point and a terminal point for each region $J_0$, $J_1$, $J_2$ are stored as data, and this data is converted to dot pattern data during the displaying of a character by the word processor.

As shown in FIG. 6, a conic spline represented as the curve $J_n$ approximates the curve $J_2$ (FIG. 5) which is a portion of a character outline. Curve $J_n$ has an initial point A at coordinate address $X_A$, $Y_A$ and a terminal point B having a coordinate address $X_B$, $Y_B$. A line F extends tangentially to curve $J_n$ at initial point A. A second line G extends tangentially to curve $J_n$ from terminal point B. A control point C having a coordinate address $X_C$, $Y_C$ is defined at the intersection of lines F and G. A line segment H connecting at a midpoint D of line F and a midpoint E of line G contacts conic spline curve $J_n$ at an intermediate point M having a coordinate address $X_M$, $Y_M$. Therefore, the outline of conic spline curve $J_n$ of conic spline curve $J_n$ can be reproduced utilizing a conic spline function by storing coordinates $(X_A, Y_A)$, $(X_B, Y_B)$, $(X_C, Y_C)$ and $(X_M, Y_M)$ of starting point A, terminal point B, control point C and intermediate point M as the data indicating the outline. Storage of the conic spline in such a manner allows expansion and reduction of the size of the character to be printed which improves character quality by reducing the quantity of data to be stored. However, the prior art suffers from the disadvantage that when a character pattern having a standard size as stored is to be compressed, the print quality of the reduced character becomes deteriorated. Specifically, as seen in FIG. 4a, dots F become separated by a space E from the remaining body G of the character where a skipped part of the outline exists. Accordingly, it is desired to provide a character pattern signal generator which utilizes character outline data which may reduce the size of the character without deteriorating print quality.

SUMMARY OF THE INVENTION

Generally speaking, in accordance with the invention, an apparatus for generating character pattern signals includes an outline memory circuit for storing character code data corresponding to a character pattern of a standard size. An outline data calculation circuit receives the character code data and calculates character outline data and converts the character outline data to a compressed character outline, a standard size character outline or an expanded size character outline in response to a magnification factor input. A dot pattern generating circuit outputs dot pattern data based on the outline produced by the calculating circuit. A dot pattern compensating circuit determines when one or more dots within the character is separated from the remaining dots in the pattern by a space and compensates the dot pattern data by producing a dot to be printed within that space when the size of the space is less than a standard value.

Accordingly, it is an object of the invention to provide an improved apparatus for generating character pattern signals.

Another object of the present invention is to provide an apparatus for generating character pattern signals which may output a compressed character while maintaining a high print quality.

A further object of the invention is provide a character dot pattern signal generator which can prevent the separation of dots during generation of a dot pattern of a reduced size character.

Still other objects and advantages of the invention will in part be obvious and will in part be apparent from the specification.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the invention, reference is made to the following description taken in connection with the accompanying drawings, in which:

FIG. 1 is a block diagram of a character pattern signal generator constructed in accordance with the invention;

FIG. 2 is a diagram of the format in which data is stored in the outline data memory circuit in accordance with the invention;

FIG. 8 is a diagram illustrating obtaining of a control point and auxiliary point in accordance with the prior art.

DETAILED DESCRIPTION OF THE PREFERRED EMBODIMENTS

Figure 5:
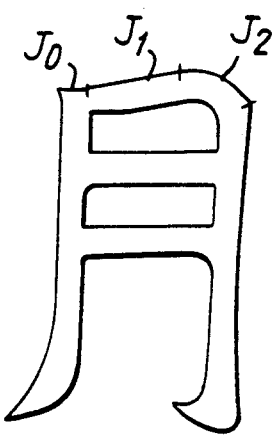
FIG. 5 is a front elevational view of a character having its perimeter divided into regions in accordance with the prior art.
Figure 6:
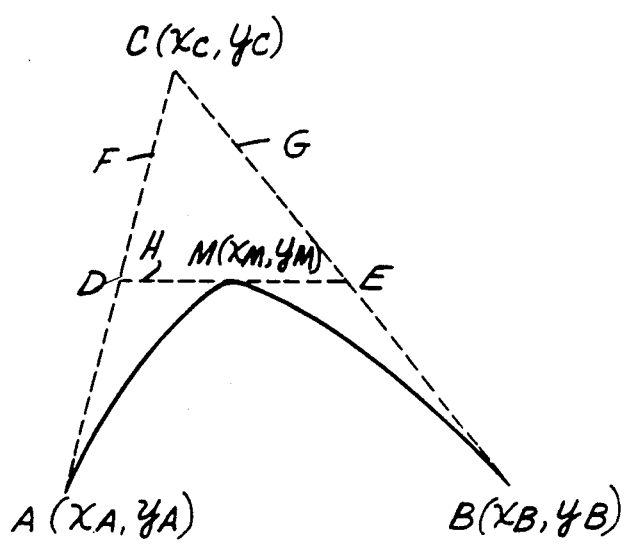

Reference is first made to FIG. 1 in which a character pattern generator constructed in accordance with the invention is provided. An outline data memory circuit 1 stores character code data for a standard sized character outline represented by the coordinates of initial point A $(X_A, Y_A)$, terminal point B $(X_B, Y_B)$ and control point C $(X_C, Y_C)$ or auxiliary point M $(X_M, Y_M)$. As seen in FIG. 2 the data is stored at address $C_1$-$C_n$ for the plurality of curves $J_0$-$J_n$ which form the outline of a character (FIG. 5). When the curve is a continuous curve, only the coordinates of endpoint B and auxiliary point M need be stored because the coordinates of the starting point of the next curve may use the ending point of the previous curve. A read out circuit 2 reads the data from outline data memory circuit 1 in response to an external read out signal.

An outline calculation circuit 3 receives the coordinates readout by read out circuit 2 and calculates character outline data corresponding to the character outline in response to a magnification signal which is input from an external source based upon external magnification factor data. If the magnification signal indicates a compressed outline, outline data calculation circuit 3 calculates a compressed character outline. If the magnification signal indicates an expanded outline, outline data calculation circuit 3 calculates and expanded character outline. A dot pattern generating circuit 4 receives the character outline data and generates dot pattern data in response thereto. A dot pattern compensation circuit 5 detects when the dot pattern data generated by dot pattern generating circuit 4 outputs a group of dots which is less than a standard number of dots required to form a portion of an outline pattern. For example, such minimum number may be two dots to indicate the minimum number of dots to correspond to a figure to be printed such as a comma. When the number of dots is smaller than a constant number of dots, dot pattern compensating circuit 5 outputs a space E between the dot or gathering of dots F and the remainder of the body G of the character formed by a plurality of dots and then supplies a dot D to connect the body G with the spaced dot F.

Figure 3:
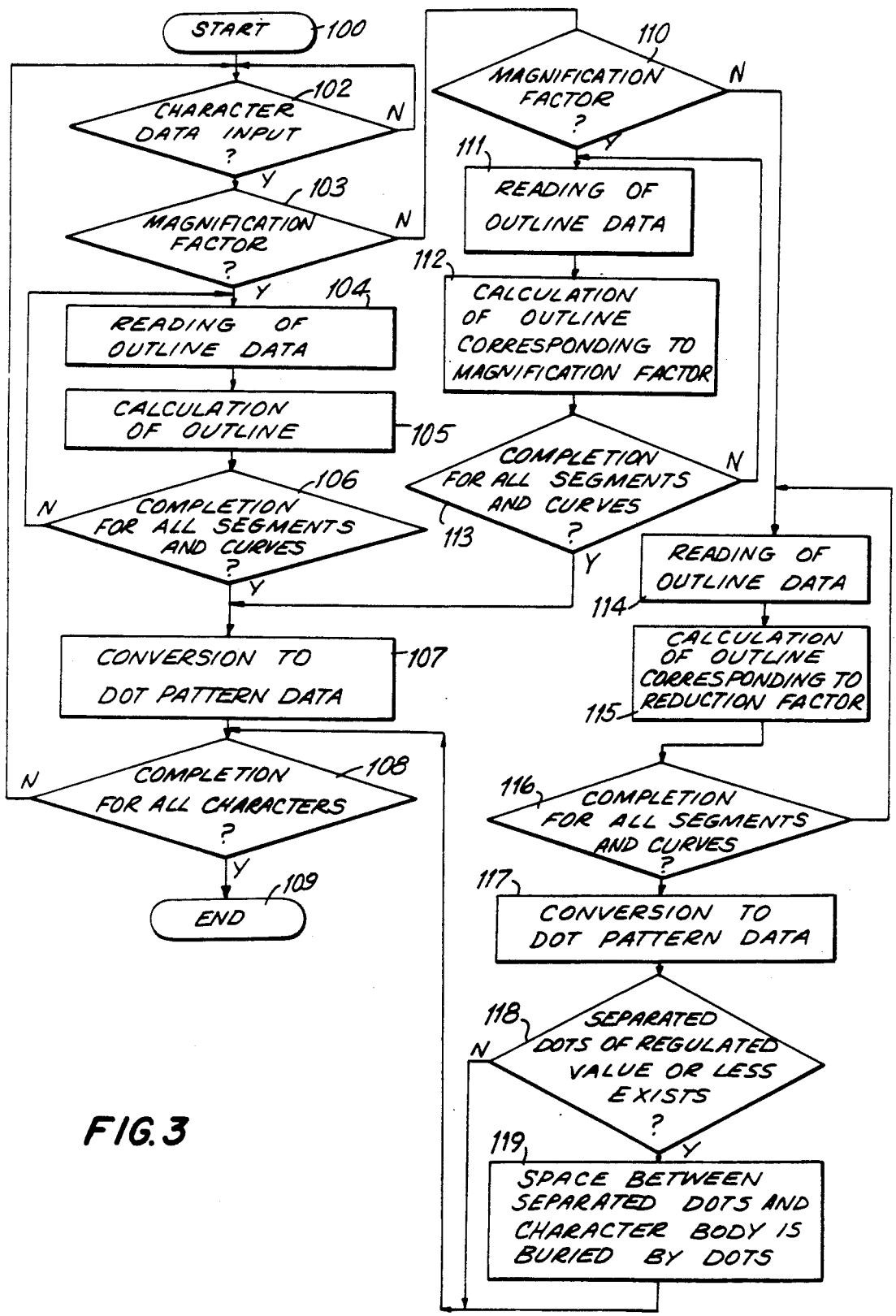
FIG. 3 is a flowchart for generating a character pattern signal in accordance with the invention.

Reference is now made to FIG. 3 in which a flowchart of the operation of the character dot pattern signal generator is provided. The operation is begun in a step 100 and it is then determined whether character code data has been input in a step 102. If the character code data has been input, it is determined whether the magnification factor is 1 in a step 103 indicating a standard size. When a character signal input from a host apparatus designates a standard size, the character code data is read out from outline data memory circuit 1 by reading circuit 2 in response to a readout signal from a host apparatus in a step 104. In a step 105, outline data calculation circuit 3 receives the read out character code data and in response to the magnification signal calculates character outline data for the segments and curves forming the outline of character to be printed based upon the coordinates of initial point A, terminal point B and auxiliary point M or control point C utilizing the convex spline function. In a step 106, it is determined whether this process has been completed for each character outline segment. If the outline has been completed, dot pattern generating circuit 4 generates dot pattern data in a step 107 and converts the dot pattern data into a dot pattern signal and outputs this signal to an external device. It is the determined whether each character to be output has been output in a step 108 and the process is either repeated to finish each character or the process is ended in a step 109.

Where the character to be printed is to be expanded, it is determined whether the character signal output from a host apparatus includes a magnification signal indicating a character larger than the standard size in a step 110. The character code data is then read from outline data memory circuit by reading circuit 2 in a step 111. In a step 112, outline data calculation circuit 3 converts the coordinates of initial point A, terminal point B and auxiliary point M or control point C output by outline data memory circuit 1 to coordinates which correspond to a character designated by the magnification factor and calculates character outline data utilizing these coordinates and the convex spline function in a step 112. In a step 113 it is determined whether this process has been completed for each segment and curve of the character. If the process has been completed, then the character outline data is converted to dot pattern data by dot pattern generating circuit 4 which then generates a dot signal forming the regions of the outline and then converts this dot signal to a dot pattern signal in a step 107.

When a reduced character is to be produced, it is determined that a host apparatus has designated a character size smaller than the standard character size in a step 110. Again, the character code data is read out from outline data memory circuit 1 by read out circuit 2 in a step 114. Outline data calculation circuit 3 converts the coordinates of starting point A, terminal point B and auxiliary point M or control point C to character code data having coordinates corresponding to a character reduced by the designated reduction factor. Outline data calculation circuit 3 then calculates character outline data corresponding to the reduction factor utilizing these reduced coordinates and a convex spline function in a step 115.

It is determined whether this conversion and calculation has been completed for all segments and curves of the character in a step 116. If it has been completed then dot pattern generating circuit 4 generates a dot pattern for producing dots on the outline and generates outline data and dot pattern data in response to the output of outline data calculation circuit 3.

Figure 4A:
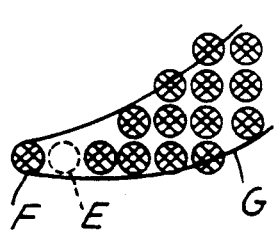
FIG. 4a is a diagram illustrating the operation of a character pattern signal generator in accordance with the prior art.
Figure 4B:
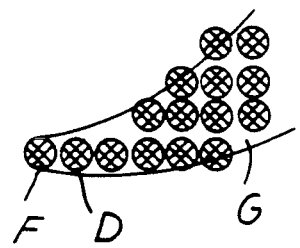
FIG. 4b is a diagram illustrating the operation of a character pattern generator in accordance with the flowchart of FIG. 3.

In some instances of reduction, during formation of the dot pattern as seen in FIG. 4a, dot F may be separated by a space E from the remaining body G of the character. This particularly happens at a "skipping" of dots in the character to be formed as continuous dots. Dot pattern compensating circuit receives the dot pattern data from dot pattern generating circuit 4 and determines whether the dots which are removed from the remainder of the character body G are less than a minimum number of dots which correspond to the reduction factor and which correspond to smaller characters such as a comma. When the dots are less than that minimum value, dot pattern compensating circuit 5 determines that these dots F are dots which have been separated from body G of the character in a step 118. If it is determined that these are such separated dots, a dot D is supplied within space B which exist on a line connecting separated dots F and character body G along its shortest distance. Thereby, separated dots F generated by dot pattern generating circuit 4 can be integrated with character body G by dot D supplied to the space E.

In this embodiment, separated dots and the character body are connected by a dot supplied by the printer. However, when the reduced character size is particularly small, sufficient character quality may be maintained for practical purposed by eliminating the separated dots.

By providing a character dot pattern signal generator, including an outline data memory for storing character code data of a standard size pattern, an outline data calculation circuit for calculating outline data in response to a magnification factor, a dot pattern generating circuit for outputting dot patter data based on the calculated outline data and a dot pattern compensating circuit for detecting the existence of separated dots separated by a predetermined number of dots or less from the dot pattern data and supplying dots within this space when this space is smaller than the predetermined value, high quality character dot patterns can be generated by a reliably preventing separated dots which may easily be generated during the formation of dot patterns of reduced characters.

It will thus be seen that the objects set forth above, among those made apparent from the preceding description are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A character pattern signal generator for generating a signal corresponding to a character having an outline formed as a plurality of dots forming a body of said character outline, comprising an outline memory means for storing character code data corresponding to an outline of standard size, outline data calculation means for receiving a magnification signal and said character code data and calculating character outline data in response thereto, dot pattern generating means for converting said character outline data to dot pattern data, and dot pattern compensating means for detecting a number of said dots separated by a space from said body of said character outline in said dot pattern data and generating a number of dots to be added to said dot pattern data at said space when said magnification factor is other than one and said number of dots is less than a predetermined value.

2. The character pattern signal generator of claim 1, further comprising readout means for reading out said character code data from said outline memory means and transmitting said character code data to said outline data calculation means.

3. The character pattern signal generator of claim 1, wherein said outline data calculation means calculates a character code corresponding to said magnification factor and calculates said character outline data corresponding to said magnification factor and based upon said character code data corresponding to said magnification factor.

4. A method for generating a signal corresponding to a character code having an outline formed as a plurality of dots forming a body of said outline comprising the steps of:

storing character code data corresponding to an outline of standard size;

receiving a magnification signal and said stored character code data and calculating character outline data in response thereto;

converting said character outline data into dot pattern data;

detecting whether a number of dots of said dot pattern data are separated by a space from said body of said character outline; and generating a number of dots to be added to said dot pattern data at said space when said magnification factor is less than one and said number of separated dots is less than a predetermined number.

* * * * *